(12) United States Patent
Koustubhan et al.

(10) Patent No.: US 12,071,245 B2
(45) Date of Patent: Aug. 27, 2024

(54) DUAL PURPOSE LEGREST FOR A MULTIPLE PASSENGER SIDE FACING AIRCRAFT SEAT

(71) Applicant: B/E Aerospace, Inc., Winston-Salem, NC (US)

(72) Inventors: Arjun Koustubhan, Hyderabad (IN); Raghavendra Kottem, Telangana (IN); Sambasiva Rao Kodati, Vinjaram (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 159 days.

(21) Appl. No.: 17/950,618

(22) Filed: Sep. 22, 2022

(65) Prior Publication Data
US 2024/0010342 A1 Jan. 11, 2024

(30) Foreign Application Priority Data
Jul. 9, 2022 (IN) .............................. 202241039495

(51) Int. Cl.
*B64D 11/06* (2006.01)
(52) U.S. Cl.
CPC ...... *B64D 11/0643* (2014.12); *B64D 11/0627* (2014.12); *B64D 11/0647* (2014.12)
(58) Field of Classification Search
CPC ............ B64D 11/0643; B64D 11/0627; B64D 11/0647
See application file for complete search history.

(56) References Cited

U.S. PATENT DOCUMENTS

| 4,509,795 A | 4/1985 | Brennan et al. |
| 6,588,839 B1 * | 7/2003 | Salzer ................ B64D 11/0643 |
| | | 297/188.03 |
| 8,226,163 B1 | 7/2012 | Pearson et al. |

(Continued)

FOREIGN PATENT DOCUMENTS

| CA | 3045558 A1 | 2/2020 |
| CN | 102341306 B | 1/2016 |

(Continued)

OTHER PUBLICATIONS

Extended European Search Report dated Oct. 20, 2023; European Application No. 23184177.6.

*Primary Examiner* — Anthony D Barfield
(74) *Attorney, Agent, or Firm* — Suiter Swantz IP

(57) ABSTRACT

A legrest assembly is disclosed. The assembly may include a plurality of frame members. The assembly may include one or more closeout panels arranged proximate to an opening within a storage compartment and configured to at least partially form the opening within the storage compartment and at least partially enclose one or more gaps formed between sidewalls of the storage compartment, the plurality of frame members, and a divan seat frame. The assembly may include a plurality of panel doors configured to open or close, the plurality of panel doors including a plurality of integrated frame members configured to couple the plurality of doors to a frame member of the plurality of frame members. The assembly may include a panel door latch mechanism configured to open the plurality of panel doors, the panel door latch mechanism including a door handle and a door latch assembly.

15 Claims, 11 Drawing Sheets

(56) References Cited

U.S. PATENT DOCUMENTS

| | | | |
|---|---|---|---|
| 2006/0006704 A1* | 1/2006 | Skelly | B64D 11/0643 297/188.08 |
| 2019/0031353 A1 | 1/2019 | Texeraud | |
| 2019/0047445 A1 | 2/2019 | Kim et al. | |

FOREIGN PATENT DOCUMENTS

| | | | |
|---|---|---|---|
| DE | 102020106032 A1 * | 9/2021 | B64D 11/0643 |
| EP | 3239051 A1 | 11/2017 | |
| EP | 3126240 B1 | 8/2020 | |
| EP | 3604133 B1 | 5/2021 | |
| GB | 2513203 B | 3/2015 | |

\* cited by examiner

DUAL PURPOSE LEGREST FOR A MULTIPLE PASSENGER SIDE FACING AIRCRAFT SEAT

CROSS-REFERENCE TO RELATED APPLICATIONS

The present application claims priority to India Provisional Patent Application No. 202241039495, filed Jul. 9, 2022, entitled DUAL PURPOSE LEGREST FOR A MULTIPLE PASSENGER SIDE FACING AIRCRAFT SEAT, naming Arjun Koustubhan, Raghavendra Kottem, and Sambasiva Kodati as inventors, which is incorporated by reference in the entirety.

BACKGROUND

Typical aircraft side-facing seats traditionally have a tracking seat pan. Underneath the seat panel the seat often has a storage compartment. It is often is desirable to have a legrest for more comfort, however, conventional legrests often prevent access to the storage compartment.

SUMMARY

A divan is disclosed, in accordance with one or more embodiments of the present disclosure. The divan includes a divan seat frame, the divan seat frame including a backrest frame and a seat pan frame, the backrest frame including a first backrest frame portion and a second backrest frame portion, the seat pan frame including a first seat pan frame portion and a second seat pan frame portion, the first backrest frame portion configured to actuate independently from the second backrest frame portion, the first seat pan frame portion configured to actuate independently from the second seat pan frame portion via a seat pan tracking assembly. The divan includes a storage compartment positioned underneath the seat pan frame, the storage compartment including one or more sidewall defining a cavity for stowage, the storage comparting including an opening configured to provide a passenger access to the cavity. The divan includes a legrest assembly. The legrest assembly includes a plurality of frame members, at least one frame member of the plurality of frame members coupled to a portion of the seat pan frame. The legrest assembly includes one or more closeout panels arranged proximate to the opening within the storage compartment, the one or more closeout panels configured to at least partially form the opening within the storage compartment and at least partially enclose one or more gaps formed between the one or more sidewalls of the storage compartment, the plurality of frame members, and one or more portions of the divan seat frame. The legrest assembly includes a plurality of panel doors, the plurality of panel doors configured to at least one of open or close, the plurality of panel doors including a plurality of integrated frame members configured to couple the plurality of doors to at least one frame member of the plurality of frame members. The legrest assembly includes a panel door latch mechanism configured to open the plurality of panel doors, the panel door latch mechanism including a door handle and a panel door latch assembly.

In some embodiments, the storage compartment may include an access door configured to at least partially enclose the opening of the storage compartment.

In some embodiments, the storage compartment may include a mesh liner configured to couple to a portion of the one or more sidewalls to secure one or more stowage items to the portion of the one or more sidewalls.

In some embodiments, the latch assembly of the panel door latch mechanism may include a spring-loaded pin sub-assembly, the spring-loaded pin sub-assembly includes a compressible spring and a spring-loaded pin, the spring-loaded pin configured to couple to at least one integrated frame member of the plurality of frame members on the panel door.

In some embodiments, the door handle may be configured to compress the compressible spring to cause the spring-loaded pin to disengage from a hole on a portion of the closeout panel.

In some embodiments, at least one integrated frame member of the plurality of frame members may include a slot configured to receive at least a portion of a fixed pin coupled to a portion of the closeout panel when the panel door is in the closed position, the fixed pin positioned proximate to the hole on the closeout panel.

In some embodiments, the storage compartment may be configured to stow an inflatable life raft.

In some embodiments, the divan may further include at least one backrest cushion configured to couple to a portion of the backrest frame.

In some embodiments, the divan may further includes at least one seat pan cushion configured to couple to a portion of the seat pan frame.

A legrest assembly is disclosed, in accordance with one or more embodiments of the present disclosure. The legrest assembly includes a plurality of frame members, at least one frame member of the plurality of frame members coupled to a portion of the seat pan frame. The legrest assembly includes one or more closeout panels arranged proximate to the opening within the storage compartment, the one or more closeout panels configured to at least partially form the opening within the storage compartment and at least partially enclose one or more gaps formed between the one or more sidewalls of the storage compartment, the plurality of frame members, and one or more portions of the seat frame. The legrest assembly includes a plurality of panel doors, the plurality of panel doors configured to at least one of open or close, the plurality of panel doors including a plurality of integrated frame members configured to couple the plurality of doors to at least one frame member of the plurality of frame members. The legrest assembly includes a panel door latch mechanism configured to open the plurality of panel doors, the panel door latch mechanism including a door handle and a panel door latch assembly.

In some embodiments, the storage compartment may include an access door configured to at least partially enclose the opening of the storage compartment.

In some embodiments, the storage compartment may include a mesh liner configured to couple to a portion of the one or more sidewalls to secure one or more stowage items to the portion of the one or more sidewalls.

In some embodiments, the latch assembly of the panel door latch mechanism may include a spring-loaded pin sub-assembly, the spring-loaded pin sub-assembly includes a compressible spring and a spring-loaded pin, the spring-loaded pin configured to couple to at least one integrated frame member of the plurality of frame members on the panel door.

In some embodiments, the door handle may be configured to compress the compressible spring to cause the spring-loaded pin to disengage from a hole on a portion of the closeout panel.

In some embodiments, the storage compartment may be configured to stow an inflatable life raft.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1A:
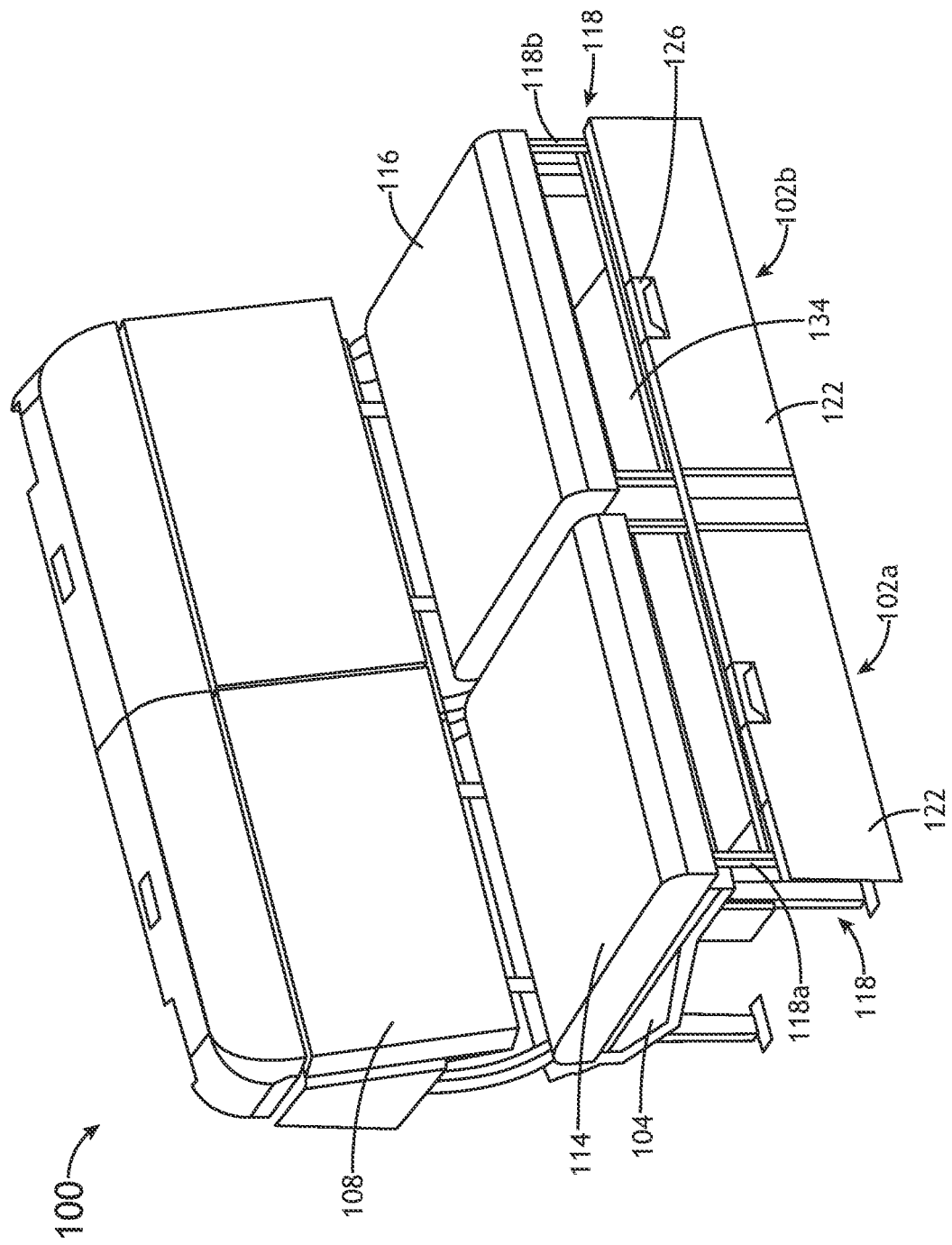
FIG. 1A illustrates a perspective view of a divan including a legrest assembly, in accordance with one or more embodiments of the disclosure.
Figure 1B:
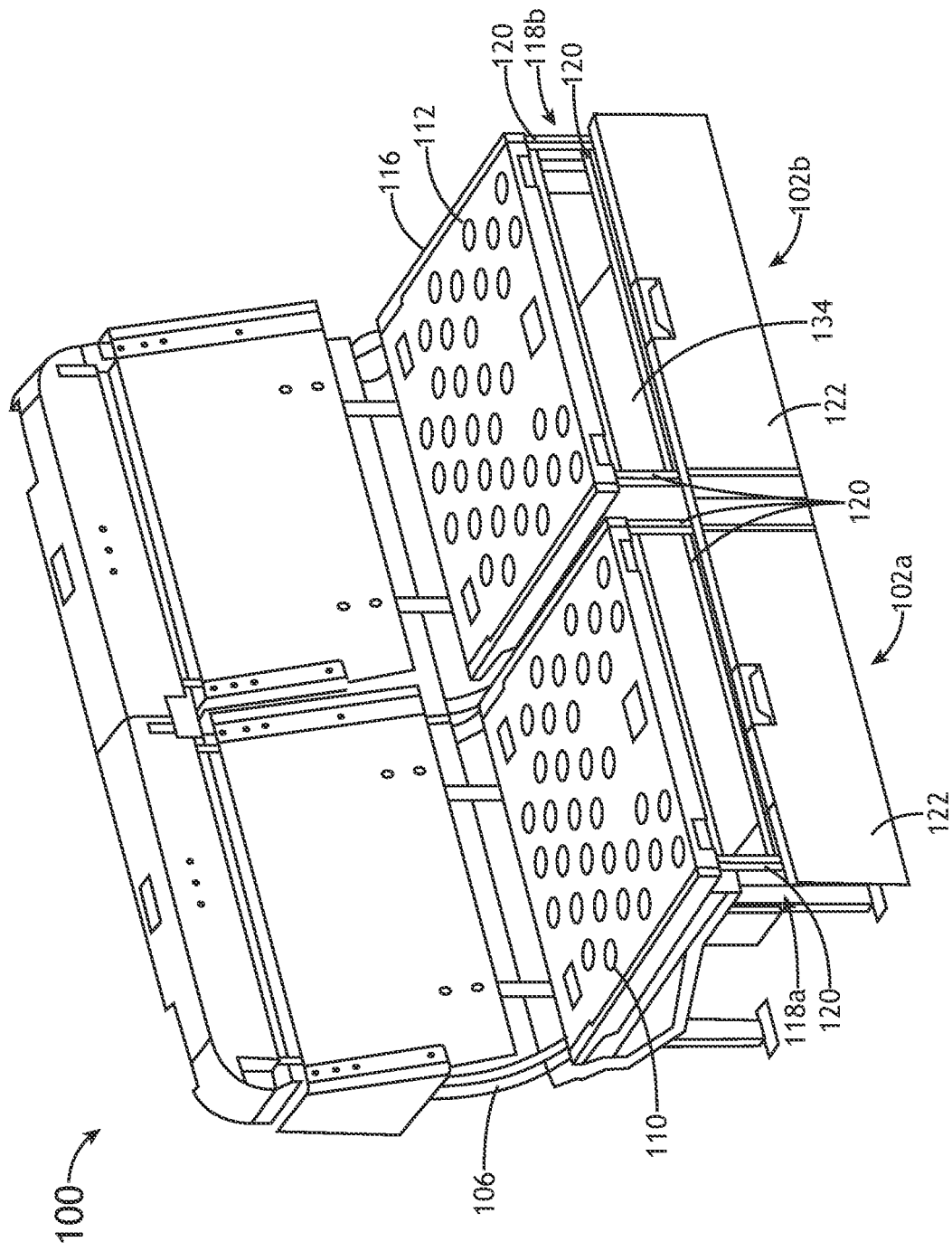
FIG. 1B illustrates a perspective view of a divan including a legrest assembly, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

Typical aircraft side-facing seats traditionally have a tracking seat pan. Underneath the seat panel the seat often has a storage compartment (e.g., for storing personal floatation devices, inflation life rafts, and the like). It is often desirable to have a legrest for more comfort, however, conventional legrests often prevent access to the storage compartment. Further, a two-place divan traditionally has a single tracking seat pan. The single tracking platform is very wide and although it offers tracking to get the occupant to a comfortable position, it forces both the occupants to track (or not track). However, one occupant might desire tracking, while the other might not.

As such, it would be desirable to provide a divan with an integrated legrest. The legrest should act as a door for the storage compartment. For example, the legrest may be configured to open to allow a passenger to access a storage compartment underneath the divan. The divan should include a large storage compartment underneath the seat pan to store inflatable life rafts, personal floatation devices, passenger items, and the like. The divan should allow individual tracking, such that the two passengers have complete freedom to choose their desired seating position without being dependent on one another.

FIGS. 1A-4B illustrate a divan 100 including a legrest assembly 102, in accordance with one or more embodiments of the disclosure.

Referring generally to FIGS. 1A-1F, the divan 100 may include a divan frame 104 (or seat frame 104). The divan frame 104 may include a backrest frame 106 including a backrest cushion 108.

Figure 1C:
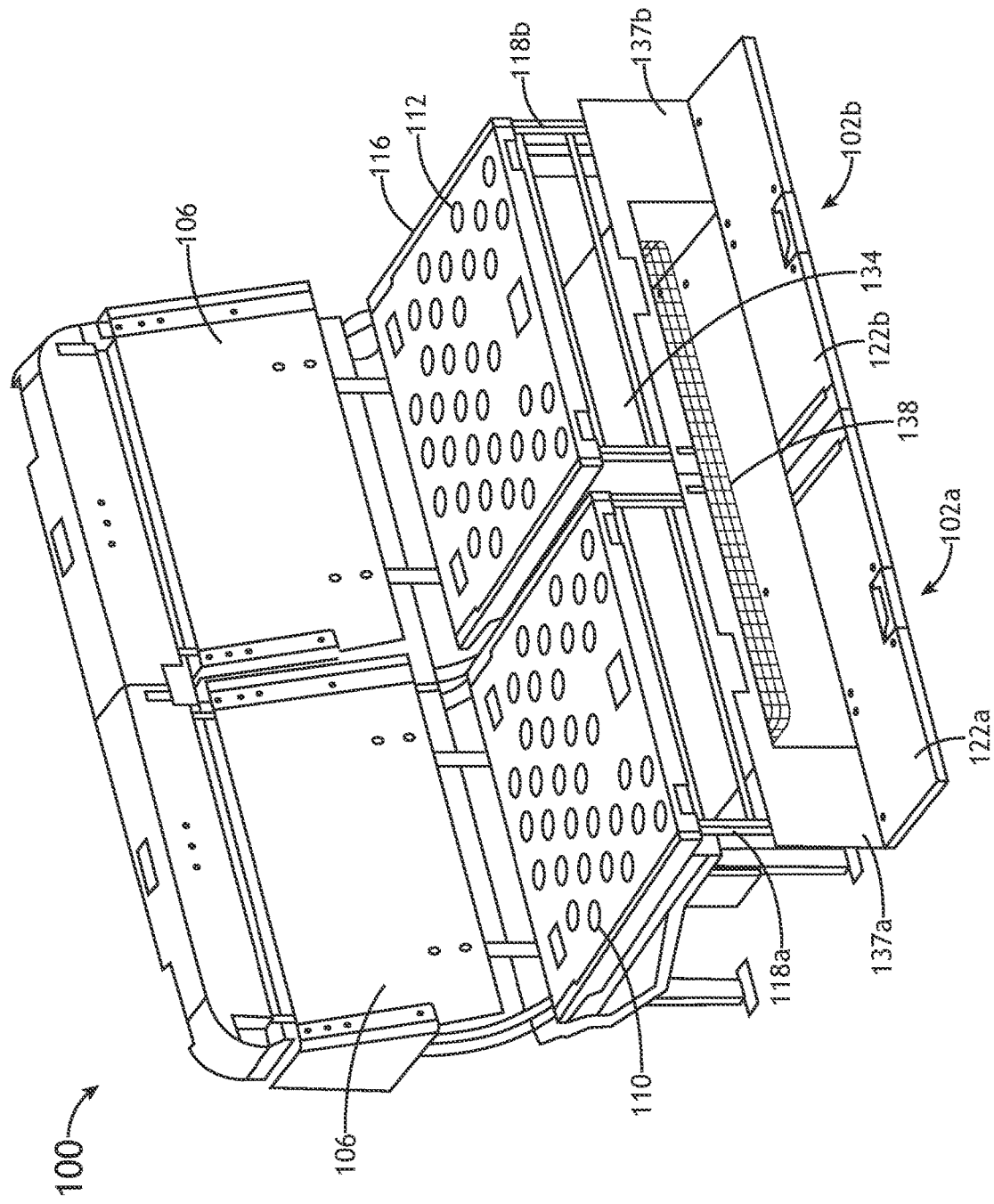
FIG. 1C illustrates a perspective view of a divan including a legrest assembly, in accordance with one or more embodiments of the disclosure.
Figure 1D:
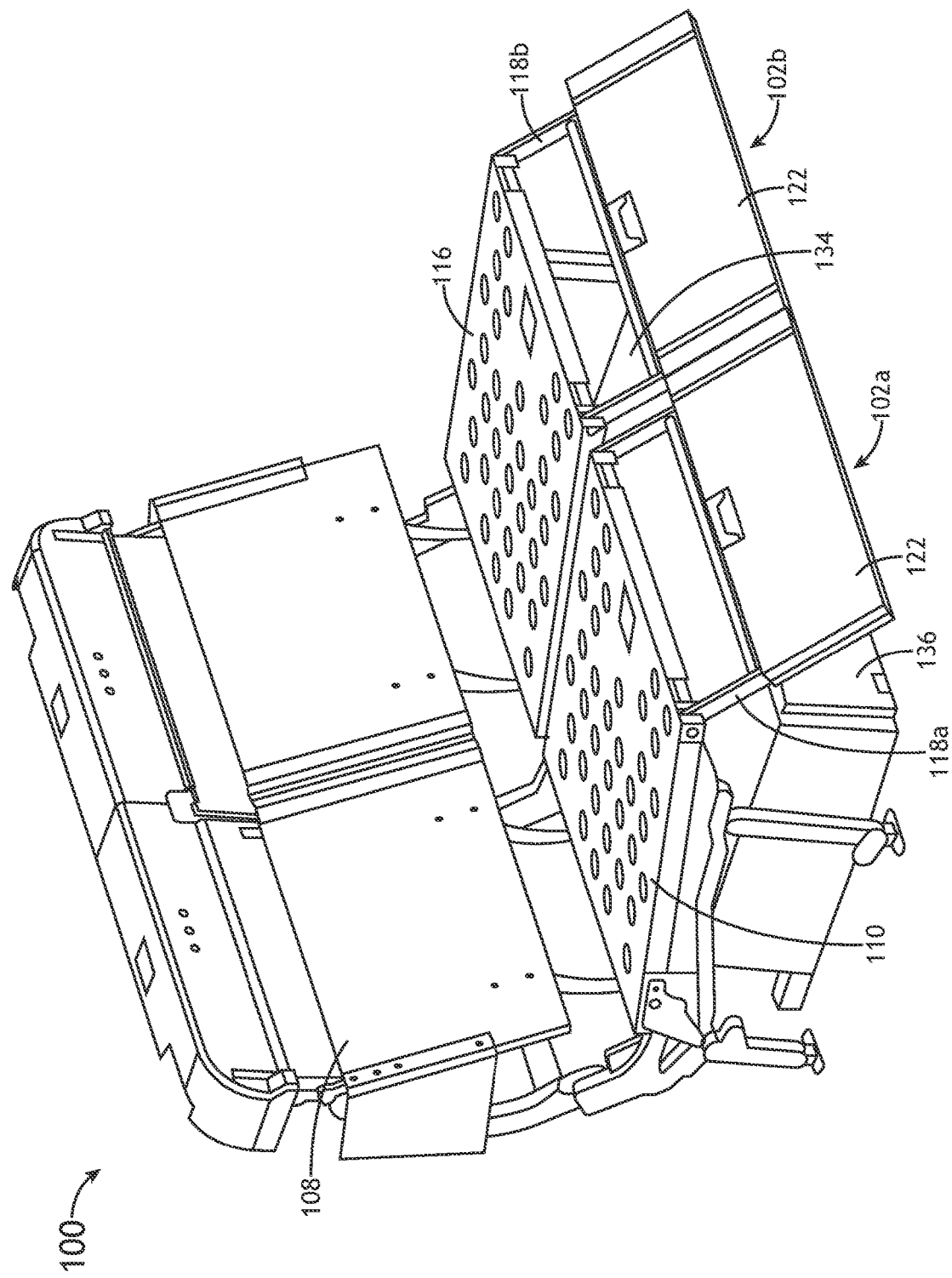
FIG. 1D illustrates a perspective view of a divan including a legrest assembly, in accordance with one or more embodiments of the disclosure.
Figure 1E:
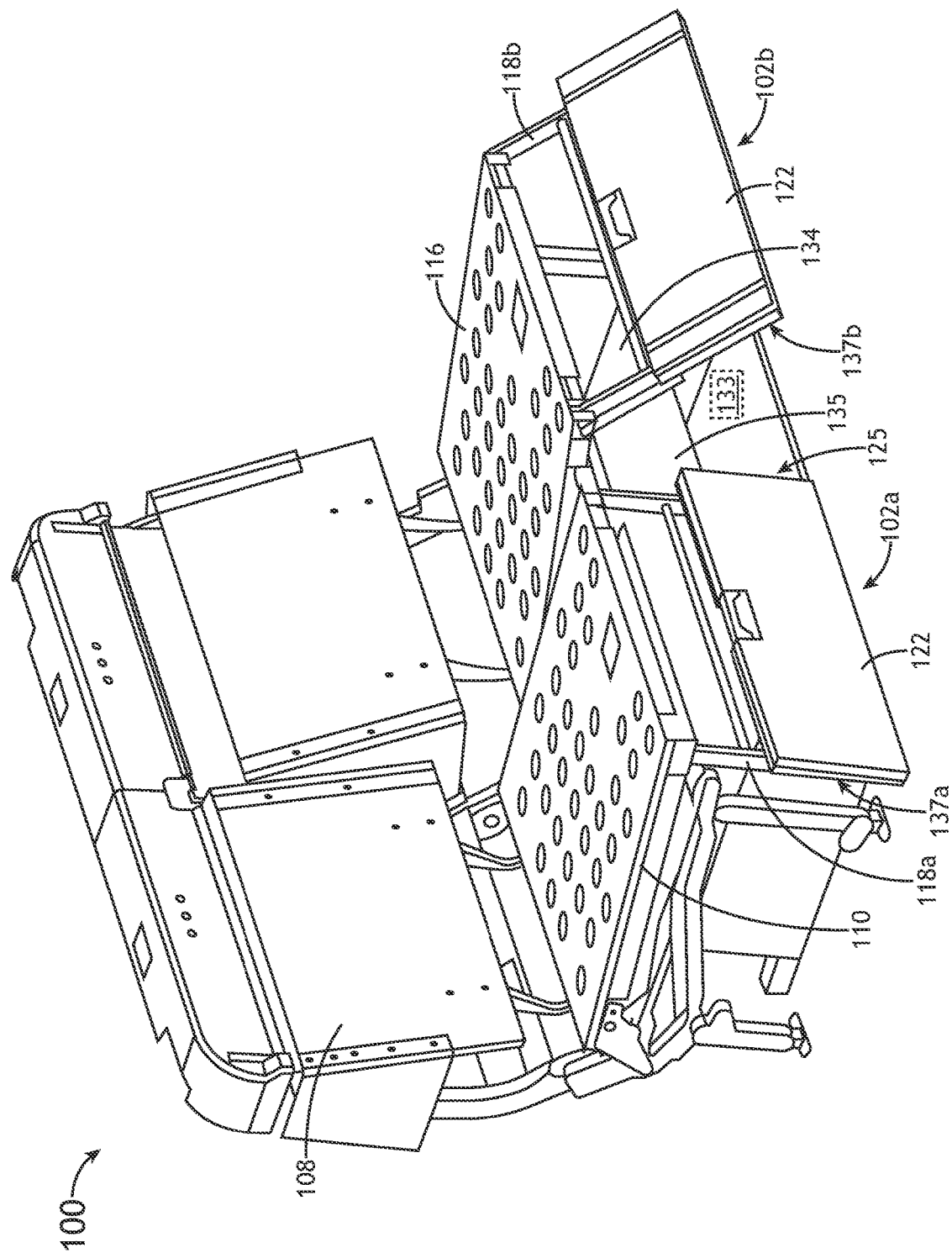
FIG. 1E illustrates a perspective view of a divan including a legrest assembly, in accordance with one or more embodiments of the disclosure.
Figure 1F:
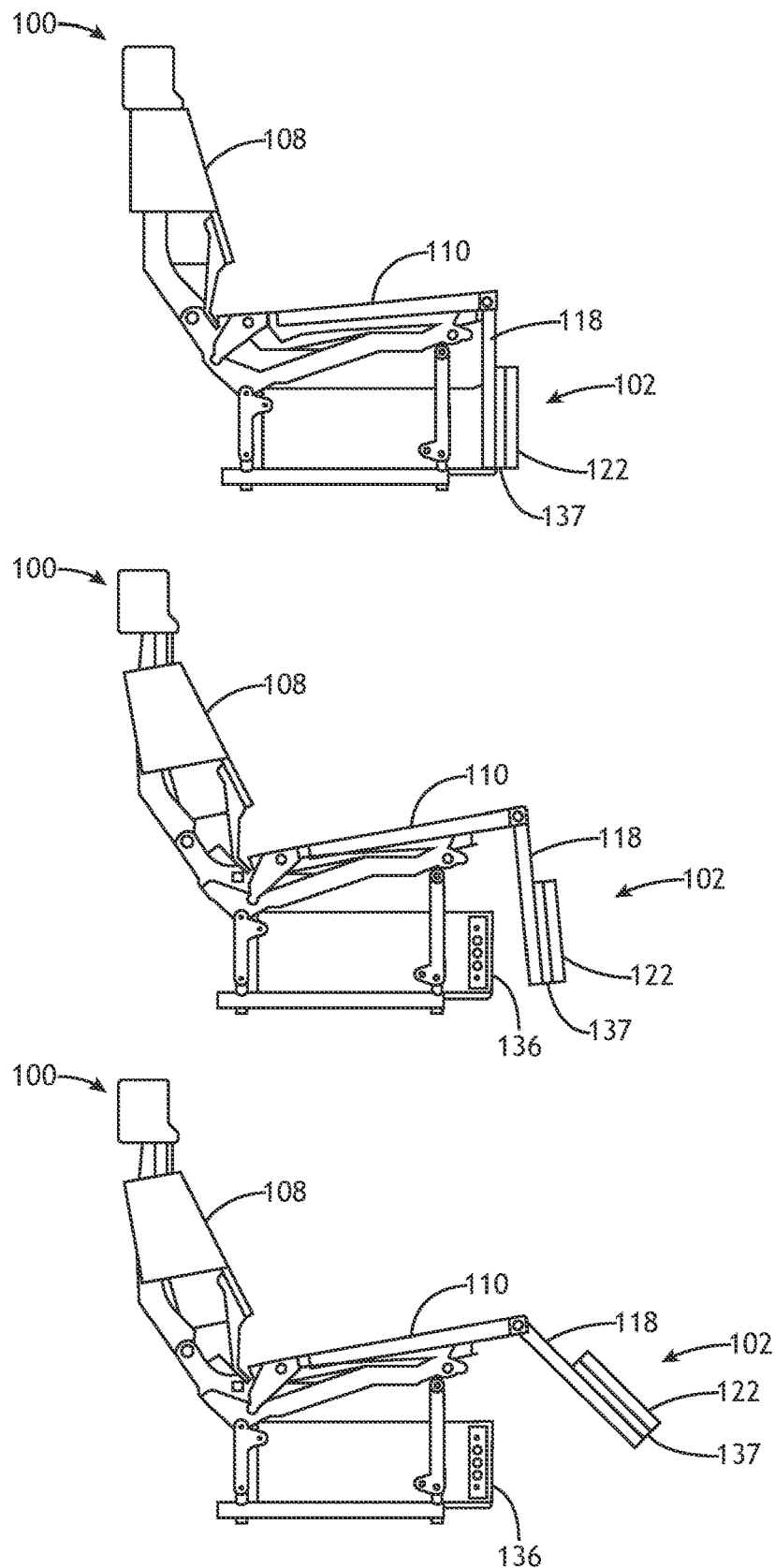
FIG. 1F illustrates a side view of a divan including a legrest assembly, in accordance with one or more embodiments of the disclosure.

The divan frame 104 may further include a seat pan frame including first seat pan frame portion 110 and a second seat pan frame portion 112. In this regard, the first seat pan frame portion 110 may actuate independently from the second seat pan frame portion 112, and vice versa. For example, a first passenger occupying the first seat pan frame portion 110 may control the actuation of the first seat pan frame portion 110 and an additional passenger occupying the second seat pan frame portion 112 may control the actuation of the second seat pan frame portion 112. In one instance, as shown in FIG. 1C, a first passenger occupying the first seat pan frame portion 110 may wish to be seated in an upright position, while an additional passenger occupying the second seat pan frame portion 112 may also wish to be seated in an upright position. In another instance, as shown in FIG. 1D, a first passenger occupying the first seat pan frame portion 110 may wish to be seated in a reclined (or bed position), while an additional passenger occupying the second seat pan frame portion 112 may also wish to be seated in a reclined position (or bed position). In one instance, as shown in FIG. 1E, a first passenger occupying the first seat pan frame portion 110 may wish to be seated in the upright position, while an additional passenger occupying the second seat pan frame portion 112 may wish to actuate the additional seat pan frame portion 112 to a reclined position (or bed position). It is noted that FIGS. 1A-1F are provided merely for illustrative purposes and shall not be construed as limiting the scope of the present disclosure.

The first seat pan frame portion 110 and the second seat pan frame portion 112 may include at least one seat pan cushion. For example, as shown in FIG. 1A, the divan 100 may include a first seat pan cushion 114 coupled to the first seat pan frame 110 and a second seat pan cushion 116 coupled to the second seat pan frame 112.

The divan 100 may include one or more legrest assemblies 102. For example, the seat frame may include a first legrest assembly 102a coupled to a portion of the first seat pan frame portion 110 and a second leg rest assembly 102b coupled to a portion of the second seat pan frame portion 112.

Each legrest assembly 102 may include a legrest frame sub-assembly 118 configured to couple to a portion of the seat pan frame, such that each legrest assembly 102 is coupled to one or more portions of the divan 100. For example, a first legrest frame sub-assembly 118a may be configured to couple to a portion of the first seat pan frame portion 110 and a second legrest frame sub-assembly 118b may be configured to couple to a portion of the second seat pan frame portion 112.

Each legrest frame sub-assembly may include a plurality of frame members 120. For example, the first legrest frame sub-assembly 118a may include a first frame member configured to couple the first legrest frame sub-assembly 118a to a first portion (e.g., left side) of the first seat pan frame portion 110 (e.g., left seat pan frame portion) and a second frame member configured to couple the first legrest frame sub-assembly 118a to a second portion (e.g., right portion) of the first seat pan frame portion 110 (e.g., left seat pan frame portion). By way of another example, the second legrest frame sub-assembly 118a may include a first frame member configured to couple the second legrest frame sub-assembly 118b to a first portion (e.g., left side) of the second seat pan frame portion 112 (e.g., right seat pan frame portion) and a second frame member configured to couple the second legrest frame sub-assembly 118b to a second portion (e.g., right portion) of the second seat pan frame portion 112 (e.g., right seat pan frame portion).

The plurality of frame members 120 may include one or more integrated frame members 124 integrated with one or more portions of the panel door 122.

Figure 2A:
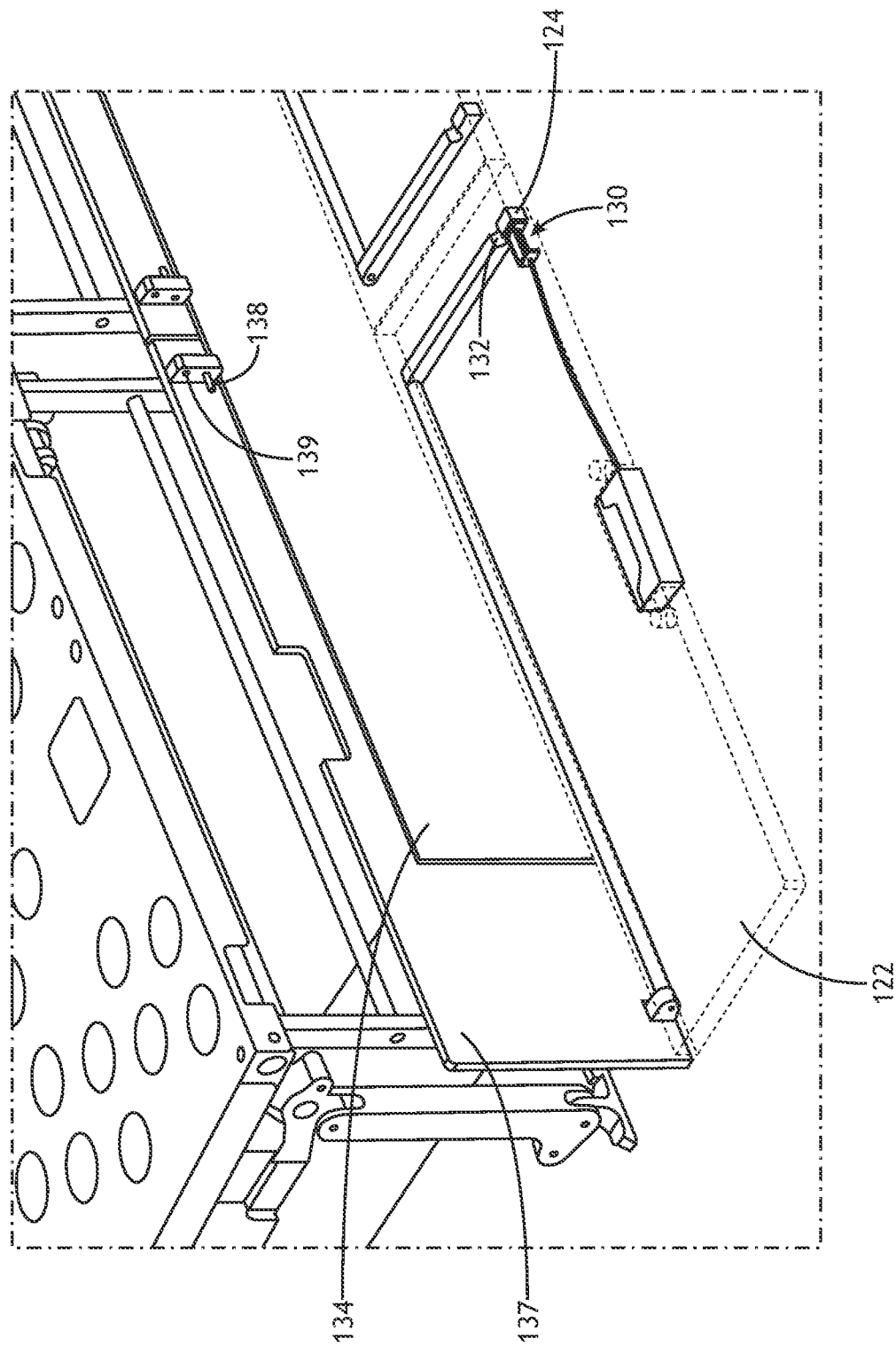
FIG. 2A illustrates a detailed view of a legrest assembly in an open position, in accordance with one or more embodiments of the disclosure.
Figure 2B:
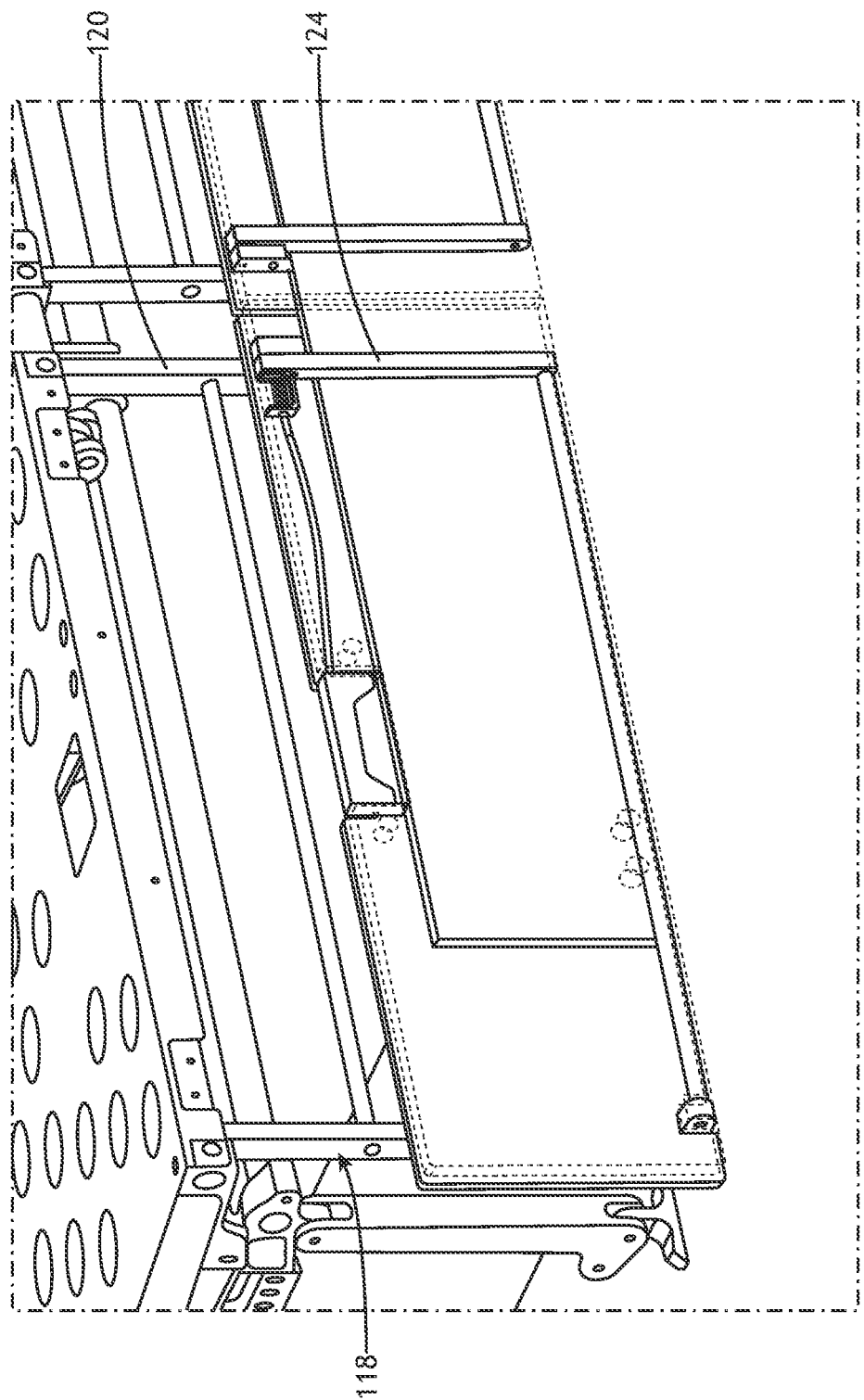
FIG. 2B illustrates a detailed view of a legrest assembly in a closed position, in accordance with one or more embodiments of the disclosure.

Each legrest assembly 102 may include a panel door 122 coupled to a portion of the legrest frame sub-assembly 118. For example, as shown in FIGS. 2A-2B, a bottom edge of the panel door 122 may be configured to couple to a bottom frame member 120. By way of another example, a top edge of the panel door 122 may be configured to couple to a plurality of side frame members 120.

The legrest assembly 102 may include a closeout panel 137 configured to couple to one or more portions of the legrest frame sub-assembly 118. For example, the closeout panel 137 may include a first closeout panel 137a coupled to one or more portions of the first seat pan frame portion 110 and a second closeout panel 137b coupled to one or more portions of the second seat pan frame portion 112. In this regard, when the first closeout panel 137a and the second closeout panel 137b are coupled to the legrest frame assembly 118, the closeout panels 124a, 124b may at least partially form an opening 125 to allow a passenger to access the contents within the storage compartment 134 via the opening within the cavity of the storage compartment. Further, the closeout panels 124a, 124b may be configured to at least partially enclose one or more gaps formed between one or more portions of the storage compartment 134 and one or more portions of the divan frame 102 (e.g., one or more legs of the divan frame). Although FIG. 1C depicts the closeout panel 137 as two separate components, it is noted that the closeout panel 137 may be a single closeout panel 137 configured to at least partially form an opening 125 and at least partially enclose one or more gaps between the storage compartment 134 and one or more portions of the divan frame 102 (e.g., one or more legs of the divan frame).

The panel door 122 may include a latch mechanism 126 configured to cause the panel door 122 to open and close, such that a passenger may access a storage compartment positioned underneath the seat pan frame.

Figure 3:
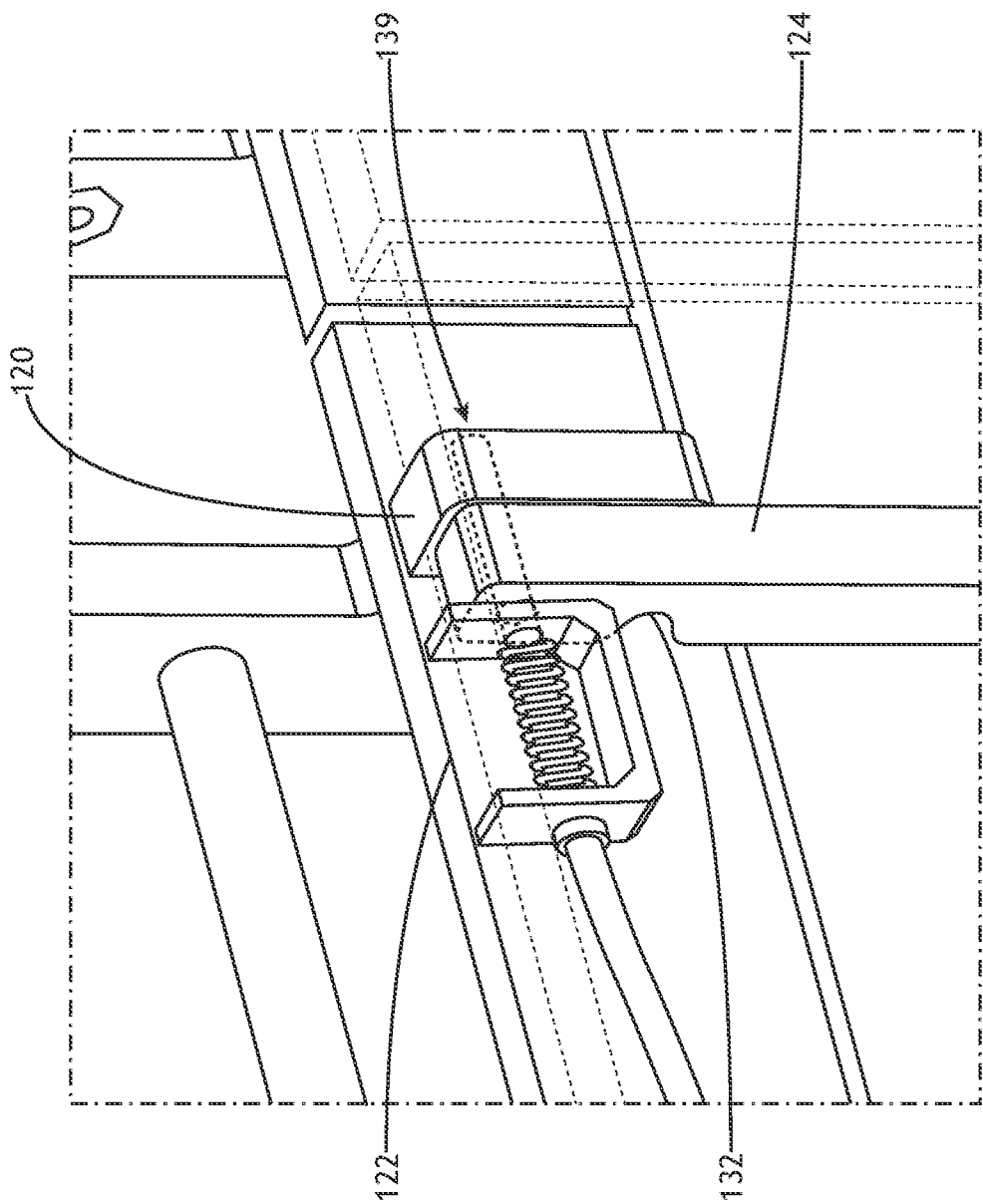
FIG. 3 illustrates a detailed view of frame members of the legrest assembly in a closed position, in accordance with one or more embodiments of the disclosure.
Figure 4A:
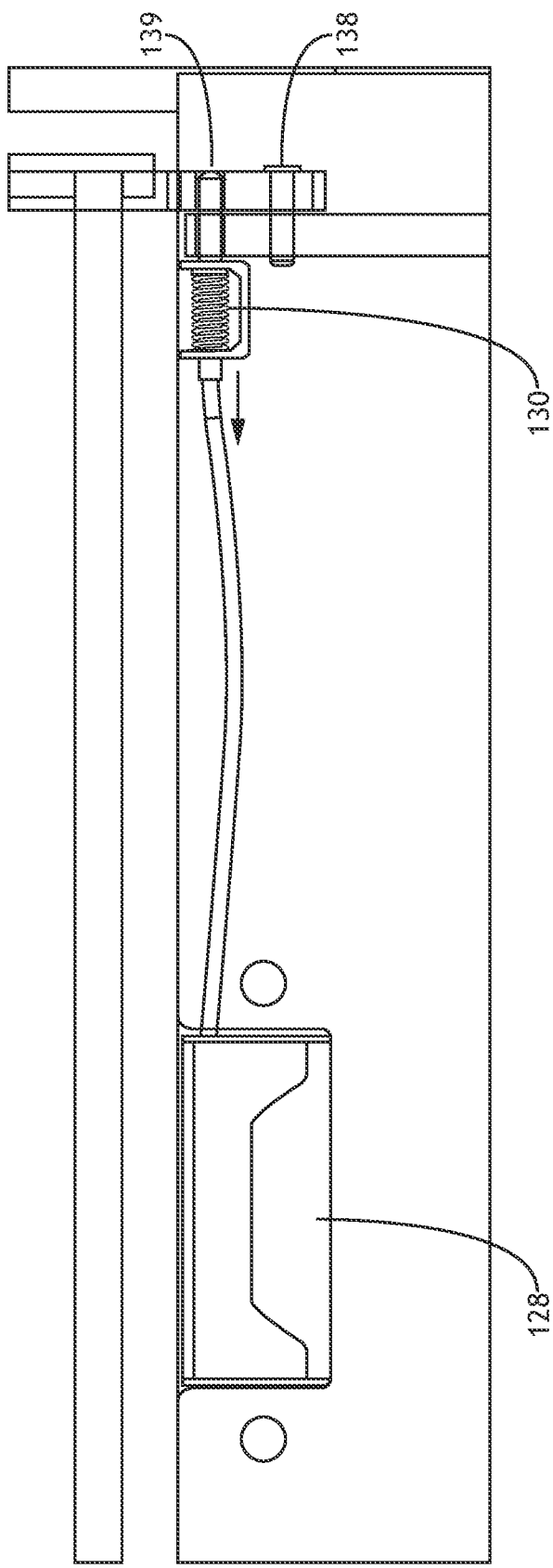
FIG. 4A illustrates a front view of a latch mechanism of the legrest assembly in a closed position, in accordance with one or more embodiments of the disclosure.
Figure 4B:
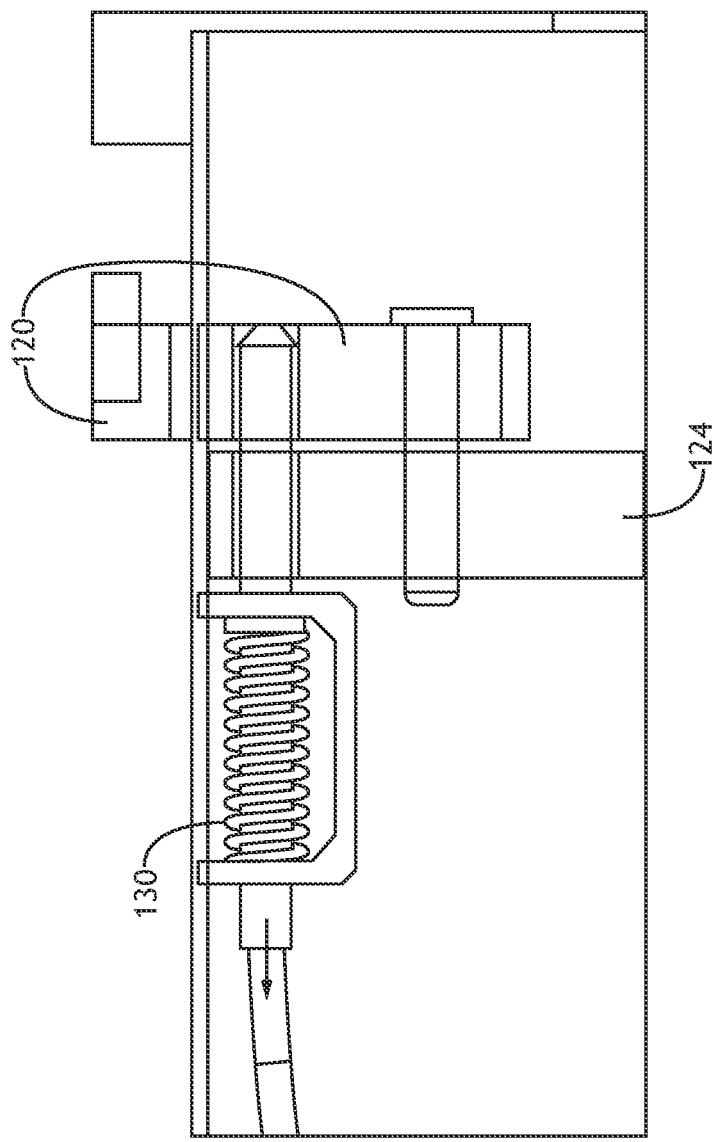
FIG. 4B illustrates a detailed front view of a latch mechanism of the legrest assembly in a closed position, in accordance with one or more embodiments of the disclosure.

Referring to FIGS. 4A-4B, the latch mechanism 126 may include a handle 128 and a spring-loaded pin 130. For example, the handle 128 may be configured to cause the panel door 122 to open by compressing the spring-loaded pin 130 positioned on the panel door 122, thereby causing the spring-loaded pin 130 to disengage from a hole 139 coupled to a portion of the closeout panel 137 (as shown in FIG. 3). In one instance, the handle 128 may be coupled to a spring of the spring-loaded pin 130 to cause the spring to compress which causes the spring-loaded pin 130 to disengage from the hole 139 on the closeout panel 137 such that the panel door(s) 122 may be opened. In another instance, the handle 128 may expand the spring to cause the spring-loaded pin 130 to engage with the hole 139 on the closeout panel 137 such that the panel doors 122 may be closed.

The integrate frame member 124 within the panel door 122 may include a slot 132 configured to receive a fixed pin 138 coupled to a portion of the closeout panel and positioned proximate to the hole 139. For example, when the panel door 122 is in the closed positioned, the slot 132 may be configured to receive at least a portion of the fixed pin 138.

Although FIG. 3 depicts the latch mechanism as a spring-loaded latch mechanism, it is noted that the latch mechanism may include any type of latch mechanism suitable for opening/closing the panel door 122. For example, the latch mechanism may include a simple pull strap latch mechanism.

The divan 100 may include the storage compartment 134 positioned underneath the seat pan frame. For example, as shown in FIG. 1C, the storage compartment 134 may include one or more sidewalls 135 that define a cavity 133 for storage. For instance, the one or more sidewalls 135 may define a cavity 133 including an opening 135 for storage of one or more compartment items. Although the seat pan frame portions may be independently tracked, it is noted that where the divan is the cavity may span the entire surface under the seat pan frame (e.g., not separated into two separate cavities) such that the large storage compartment underneath the divan 100 is preserved.

The one or more storage compartments 134 may be configured to receive and hold medical supplies, medical devices, medical tools, or the like. The one or more storage compartments may include one or more safety devices (e.g., inflatable lift raft, air masks, personal floatation devices, or the like).

The one or more storage compartments may include a storage compartment configured to receive luggage or other belongings of the cabin attendant.

The one or more storage compartments may be configured to receive and hold (e.g., contain, secure, or the like) one or more passenger amenities including, but not limited to, paper-printed materials (e.g., magazines, newspapers, pamphlets, or the like), select personal electronic devices (e.g., phones, tablets, phablets, laptops, music devices, digital video disc (DVD) players, handheld gaming consoles or devices, or the like), food products, drink products, bassinets, blankets, or the like.

The one or more storage compartments may include one or more electronic connections for one or more passenger amenities such as, but not limited to, one or more charging ports, one or more charging cables, or the like.

The one or more storage compartments may include one or more electronic connections in communication with one or more components of the suite such as, but not limited to, one or more display device connection ports, one or more display device connection cables, one or more audio output jacks (e.g., headphone jacks), one or more audio input jacks, or the like.

In some embodiments, as shown in FIG. 1D, the storage compartment 134 may include an access door 136 configured to enclose at least a front opening 125 of the cavity 133 of the storage compartment. For example, the access door 136 may be configured to open to allow a passenger to access the contents of the storage compartment. In one instance, the access door 136 may include a first access door configured to allow a passenger to access the contents of the storage compartment below the first seat pan frame portion 110 and a second access door configured to allow a passenger to access the contents of the storage compartment below the additional seat pan frame portion 112. In another instance, the access door 136 may include a single access door configured to open to allow the passenger(s) occupying the divan to access the contents of the storage compartment below the first and/or second seat pan frame portion 110, 112, respectively.

The panel doors 122 may be configured to provide access to the access door 136 enclosing at least a front opening of the storage compartment 134. For example, the panel doors 122 may be dimensioned such that there is no gap between adjacent panel doors 122 to fully enclose the front opening of the storage compartment. In this regard, the panel doors 122 are configured to function as a storage compartment door when in the closed position, while also functioning as a legrest. When the panel doors are in the open position, the access door 136 to the storage compartment 134 may be opened to allow a passenger to access the contents of the storage compartment 134.

In some embodiments, the storage compartment 134 may include a mesh liner 140 (or net) configured to secure the storage compartment components to one or more portions of the one or more sidewalls of the cavity of the storage compartment 134. For example, as shown in FIG. 1C, the storage compartment 134 may include a mesh liner 140 (or net) configured to secure a storage compartment component (e.g., inflatable life raft) to a portion of a top sidewall of the cavity of the storage compartment 134, such that the storage compartment component (e.g., inflatable life raft) does not unintentionally exit the storage compartment when the panel door 122 is in the open position.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A divan, the divan comprising:
    a divan seat frame, the divan seat frame including a backrest frame and a seat pan frame, the backrest frame including a first backrest frame portion and a second backrest frame portion, the seat pan frame including a first seat pan frame portion and a second seat pan frame portion, the first backrest frame portion configured to actuate independently from the second backrest frame portion, the first seat pan frame portion configured to actuate independently from the second seat pan frame portion via a seat pan tracking assembly;
    a storage compartment positioned underneath the seat pan frame, the storage compartment including one or more sidewall defining a cavity for stowage, the storage comparting including an opening configured to provide a passenger access to the cavity; and
    a legrest assembly, the legrest assembly comprising:
        a plurality of frame members, at least one frame member of the plurality of frame members coupled to a portion of the seat pan frame;
        one or more closeout panels arranged proximate to the opening within the storage compartment, the one or more closeout panels configured to at least partially form the opening within the storage compartment and at least partially enclose one or more gaps formed between the one or more sidewalls of the storage compartment, the plurality of frame members, and one or more portions of the divan seat frame;
        a plurality of panel doors, the plurality of panel doors configured to at least one of open or close, the plurality of panel doors including a plurality of integrated frame members configured to couple the plurality of doors to at least one frame member of the plurality of frame members; and a panel door latch mechanism configured to open the plurality of panel doors, the panel door latch mechanism including a door handle and a panel door latch assembly.

2. The divan of claim 1, wherein the storage compartment includes an access door configured to at least partially enclose the opening of the storage compartment.

3. The divan of claim 1, wherein the storage compartment includes a mesh liner configured to couple to a portion of the one or more sidewalls to secure one or more stowage items to the portion of the one or more sidewalls.

4. The divan of claim 1, wherein the latch assembly of the panel door latch mechanism includes a spring-loaded pin sub-assembly, the spring-loaded pin sub-assembly includes a compressible spring and a spring-loaded pin, the spring-loaded pin configured to couple to at least one integrated frame member of the plurality of frame members on the panel door.

5. The divan of claim 4, wherein the door handle is configured to compress the compressible spring to cause the spring-loaded pin to disengage from a hole on a portion of the closeout panel.

6. The divan of claim 5, wherein at least one integrated frame member of the plurality of frame members includes a slot configured to receive at least a portion of a fixed pin coupled to a portion of the closeout panel when the panel door is in the closed position, the fixed pin positioned proximate to the hole on the closeout panel.

7. The divan of claim 1, wherein the storage compartment is configured to stow an inflatable life raft.

8. The divan of claim 1, further comprising:
at least one backrest cushion configured to couple to a portion of the backrest frame.

9. The divan of claim 1, further comprising:
at least one seat pan cushion configured to couple to a portion of the seat pan frame.

10. A legrest assembly, the legrest assembly comprising:
a plurality of frame members, at least one frame member of the plurality of frame members coupled to a portion of a divan seat pan frame;

one or more closeout panels arranged proximate to an opening within a storage compartment, the one or more closeout panels configured to at least partially form the opening within the storage compartment and at least partially enclose one or more gaps formed between one or more sidewalls of the storage compartment, the plurality of frame members, and one or more portions of a divan seat frame;

a plurality of panel doors, the plurality of panel doors configured to at least one of open or close, the plurality of panel doors including a plurality of integrated frame members configured to couple the plurality of doors to at least one frame member of the plurality of frame members; and a panel door latch mechanism configured to open the plurality of panel doors, the panel door latch mechanism including a door handle and a panel door latch assembly.

11. The legrest assembly of claim 10, wherein the storage compartment includes an access door configured to at least partially enclose the opening of the storage compartment.

12. The legrest assembly of claim 10, wherein the storage compartment includes a mesh liner configured to couple to a portion of the one or more sidewalls to secure one or more stowage items to the portion of the one or more sidewalls.

13. The legrest assembly of claim 10, wherein the latch assembly of the panel door latch mechanism includes a spring-loaded pin sub-assembly, the spring-loaded pin sub-assembly includes a compressible spring and a spring-loaded pin, the spring-loaded pin configured to couple to at least one integrated frame member of the plurality of frame members on the panel door.

14. The legrest assembly of claim 13, wherein the door handle is configured to compress the spring to cause the spring-loaded pin to disengage from a hole on a portion of the closeout panel.

15. The legrest assembly of claim 10, wherein the storage compartment is configured to stow an inflatable life raft.

* * * * *